United States Patent [19]

Berkcan

[11] Patent Number: 5,463,458
[45] Date of Patent: Oct. 31, 1995

[54] OPTICAL SENSOR FOR DUCT FAN DISCHARGE MACH NUMBERS

[75] Inventor: Ertugrul Berkcan, Niskayuna, N.Y.

[73] Assignee: General Electric Company, Schenectady, N.Y.

[21] Appl. No.: 167,009

[22] Filed: Dec. 16, 1993

[51] Int. Cl.$^6$ .................................. G01P 3/36; F02K 3/00
[52] U.S. Cl. .................................. 356/28; 60/233
[58] Field of Search ......................... 356/28; 60/233–238

[56] References Cited

U.S. PATENT DOCUMENTS

| | | | |
|---|---|---|---|
| 3,656,301 | 4/1972 | Katz | 60/236 |
| 3,676,671 | 7/1972 | Sheldon . | |
| 4,102,595 | 7/1978 | Wibbelsman | 415/1 |
| 4,242,864 | 1/1981 | Cornett et al. | 60/226.1 |
| 4,294,069 | 10/1981 | Camp | 60/238 |
| 4,385,830 | 5/1983 | Webb et al. | 356/28 |
| 4,664,513 | 5/1987 | Webb et al. | 356/28 |
| 4,946,242 | 8/1990 | Tanno et al. . | |

OTHER PUBLICATIONS

"An Improved Impulse Method For Studies Of Acoustic Transmission In Flow Ducts With Use Of Signal Synthesis And Averaging Of Acoustic Pulses" By Salikuddin, et al, Journal Of Sound And Vibration, 1984, 94(1), pp. 33–61.
A Device To Generate High Frequency Noise From Commercially Available Low Frequency Acoustic Drivers By Salikuddin, et al, Journal Of Sound And Vibration, 1988 123(2), pp. 261–280.
Optical Fiber Sensors: Systems And Applications, By Culshaw, et al, vol. 2, 1989, pp. 537–542.
Optical Fiber Sensors: Systems And Applications, By Culshaw, et al, vol. 2, 1989, pp. 576–584.

*Primary Examiner*—Stephen C. Buczinsk
*Attorney, Agent, or Firm*—Ann M. Kratz; Marvin Snyder

[57] ABSTRACT

A Mach number sensor comprises a first pulse speed sensor situated in direct contact with an open area through which a first pressure pulse can pass and a second pulse speed sensor situated in a thermally conductive tube with membrane-covered ends having stationary air through which a second pressure pulse can pass. Each of the first and second pulse speed sensors may comprise two total internal reflection detectors and a timer for determining elapsed time for passage of the pressure pulse between the two detectors. Each of the total internal reflection detectors can be selected from the group consisting of a single optical fiber having cladding removed at a surface facing the area through which the pressure pulse can pass; and a prism having a first surface facing the area through which the pressure pulse can pass, an input optical fiber optically coupled to a second surface of the prism for supplying light to the prism through the second surface, and an output optical fiber optically coupled to a third surface of the prism for detecting light emerging from the prism through the third surface.

22 Claims, 5 Drawing Sheets

5,463,458

OPTICAL SENSOR FOR DUCT FAN DISCHARGE MACH NUMBERS

BACKGROUND OF THE INVENTION

1. Field of the Invention

This invention relates generally to Mach number tuber sensors for duct fans, and, more particularly to Mach number sensors having pulse speed sensors which include internal reflection detectors.

2. Description of the Related Art

Measurement of air flow Mach number is used to enhance aircraft engine control systems. In particular, peak efficiency and stall-free operation of after-burning turbofan engines are obtained by controlling the Mach number through multivariable engine geometry. Conventional Mach number sensing techniques, however, are indirect and cannot always provide accurate results. It would be desirable to have a robust Mach number sensor which can operate with minimal effect on the air flow.

SUMMARY OF THE INVENTION

Accordingly, one object of the present invention is to provide a robust Mach n-tuber sensor without moving parts which can operate with minimal effect on air flow and be positioned near the leading edge of a duct.

Briefly, in accordance with a preferred embodiment of the invention, a Mach n-tuber sensor comprises a first pulse speed sensor situated in direct contact with an open area through which a first pressure pulse can pass and a second pulse speed sensor situated in an enclosed area having stationary air through which a second pressure pulse can pass. If desired, a tube with membrane-covered ends may be used to surround the second pulse speed sensor for providing the enclosed area. Each of the first and second pulse speed sensors may comprise two total internal reflection (TIR) detectors, with the TIR detectors facing an area through which a pressure pulse can pass and positioned so that the pressure pulse can pass over one of the TIR detectors prior to passing over the other of the TIR detectors, and means for determining elapsed time for passage of the pressure pulse between the two detectors. Each of the TIR detectors can be selected from the group of TIR detectors consisting of a single fiber having cladding removed at a surface facing an area through which the pressure pulse can pass; and a prism having a first surface facing an area through which the pressure pulse can pass, an input fiber optically coupled to a second surface of the prism for supplying light to the prism, and an output fiber optically coupled to a third surface of the prism for detecting light supplied by the input fiber.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF PREFERRED EMBODIMENTS OF THE INVENTION

Figure 1:
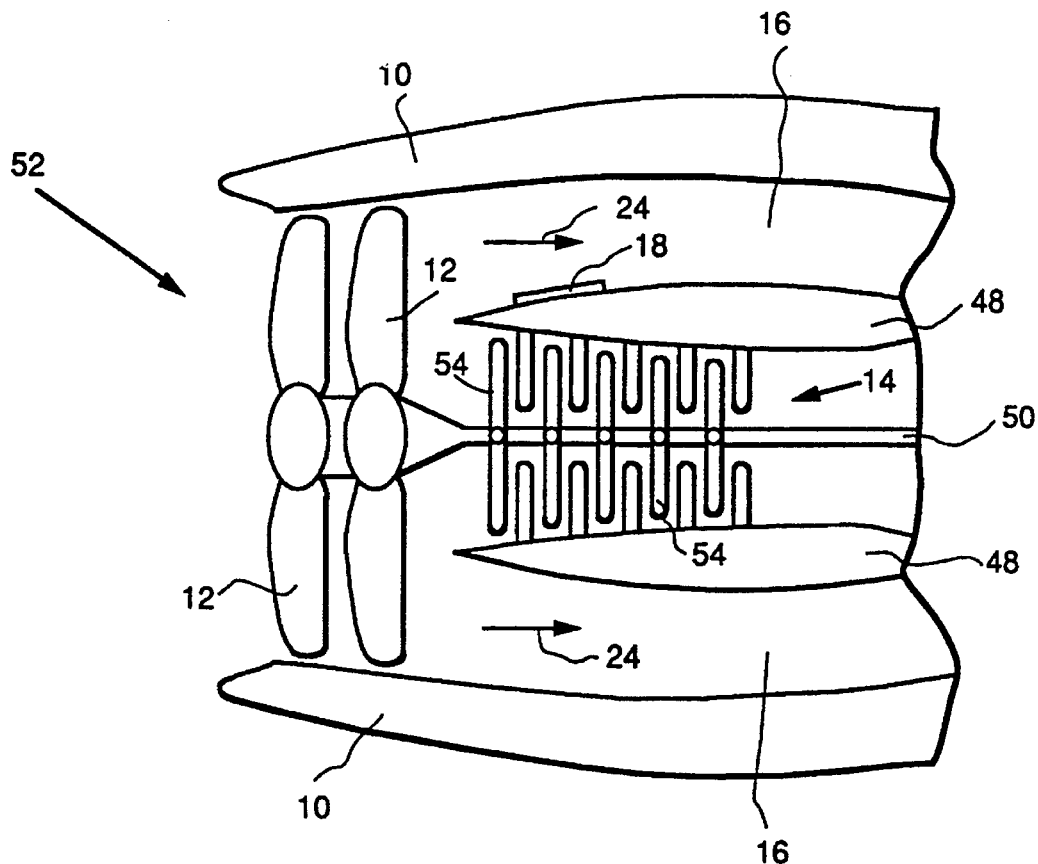
FIG. 1 is a sectional side view illustrating the placement of a Mach number sensor in an aircraft engine.

FIG. 1 is a sectional side view illustrating the placement of a Mach number sensor 18 in a turbofan engine 52. Preferably, the Mach number sensor is situated on a portion of a nacelle 48 adjacent a compressor 14 which is close to the leading edge of a duct 16 and near fans 12. Duct 16 is formed and defined by an outer shell 10 and nacelle 48. A rotating axle 50 supports fans 12 and rotating compressor blades 54. The air flow path 24 is through the duct. The advantage of situating the Mach number sensor dose to the leading edge of the duct is that near the leading edge the boundary layer (the layer of air closest to nacelle 48) is typically in the millimeters range.

Figure 2:
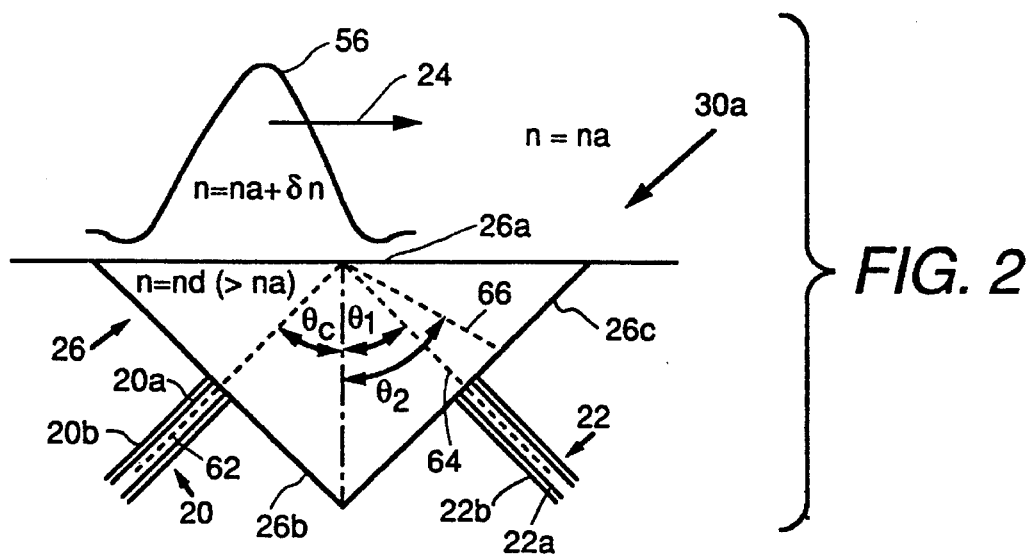
FIGS. 2–3 are sectional side views of internal reflection detectors usable in a Mach number sensor.
Figure 3:
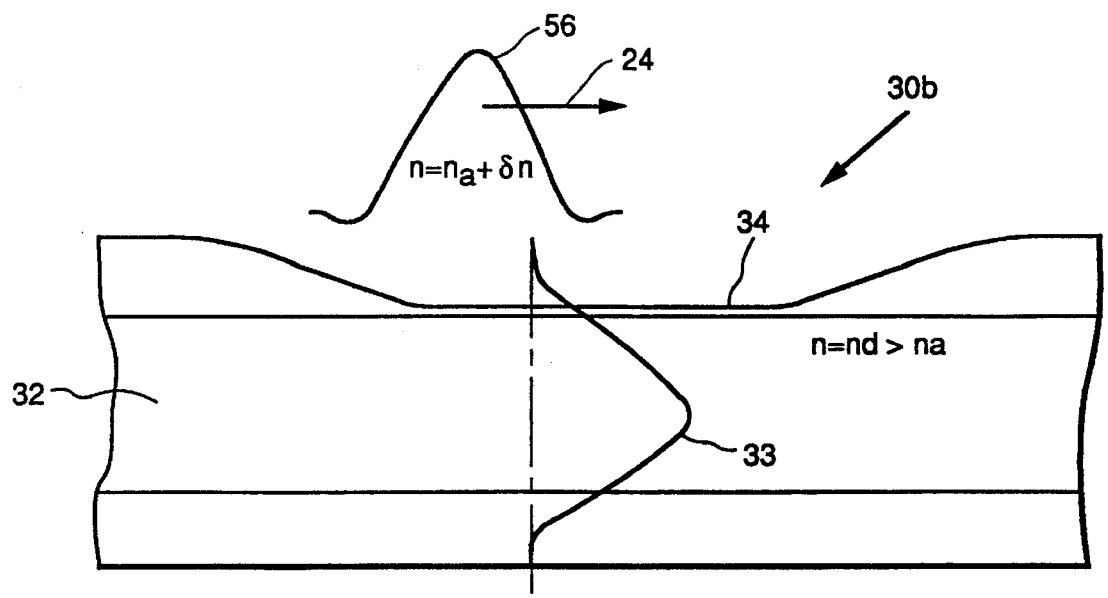

FIGS. 2–3 are sectional side views of total internal reflection (TIR) detectors usable in a Mach number sensor. The TIR detectors use the interaction of the evanescent wave of the guided mode in a prism or a fiber to monitor the index of refraction change induced by the passage of a pressure pulse 56.

In the TIR detector 30a of FIG. 2, a prism 26 which faces the air flow 24 preferably has 5 sides and is comprised of quartz or silica. Interface 26a of the prism is preferably positioned parallel to the air flow. An input optical fiber 20 is optically coupled to side 26b of the prism with micro-optics (not shown) to couple light into the prism. An output optical fiber 22 is optically coupled to side 26c of the prism for receiving light from the prism which results when there is total internal reflection at interface 26a. Input optical fiber 20 and output optical fiber 22 each have a core 20a or 22a, respectively, covered by a cladding 20b or 22b, respectively. The cores and claddings may comprise fused silica, for example.

Light path 62 represents the light in input fiber 20 moving toward the prism and the light in the prism before reaching interface 26a. Light path 64 represents the light in the prism reflected from interface 26a through the output fiber under predetermined non-pulse total internal reflection conditions, whereas light path 66 represents light in the prism when total internal reflection conditions have changed. In the preferred embodiment, the angle $\theta_1$ of the predetermined non-pulse totally internally reflected light path 64 is designed to be close to (but not smaller than) the critical angle $\theta_c$ of the prism to increase the sensitivity of the TIR detector.

In the TIR detector 30b of FIG. 3, a single optical fiber core 32 has cladding 34 selectively thinned, as shown, or altogether removed, to expose an evanescent wave of the guided wave 33 inside the fiber to air flow 24. The fiber core preferably comprises quartz or fused silica with fused silica cladding material, such as manufactured by Fiberguide Industries, Inc., Stirling, N.J. A large radius of curvature can be selected for the fiber core to increase sensitivity of the TIR detector.

In either of the TIR detector embodiments of FIG. 2 or FIG. 3, a pressure pulse 56 induces a change $n=n_a+\delta n(x,t)$ in the the index of refraction of the air stream, wherein na is the initial index of refraction of the air, and δn is the change in index of refraction of the air and is dependent on x, the distance the pulse moves, and t, the time required for the pulse to move that distance.

In either TIR embodiment, the effective change in index of refraction of the air stream, in combination with the stable index of refraction nd in the fiber or prism, results in a change or "violation" of the predetermined non-pulse total internal reflection conditions due to interaction of the evanescent field with the air. In the embodiment of FIG. 2, the totally internally reflected light path 64 at $\theta_1$ is deflected as a result of the change δn(x,t) to the position of light path 66, and $\theta_1$ increases to $\theta_2$. This causes a sudden drop in light intensity detected by the output fiber. In the embodiment of FIG. 3, the passage of the pressure pulse is detected as a sudden increase in absorption of guided wave 33.

Figure 4:
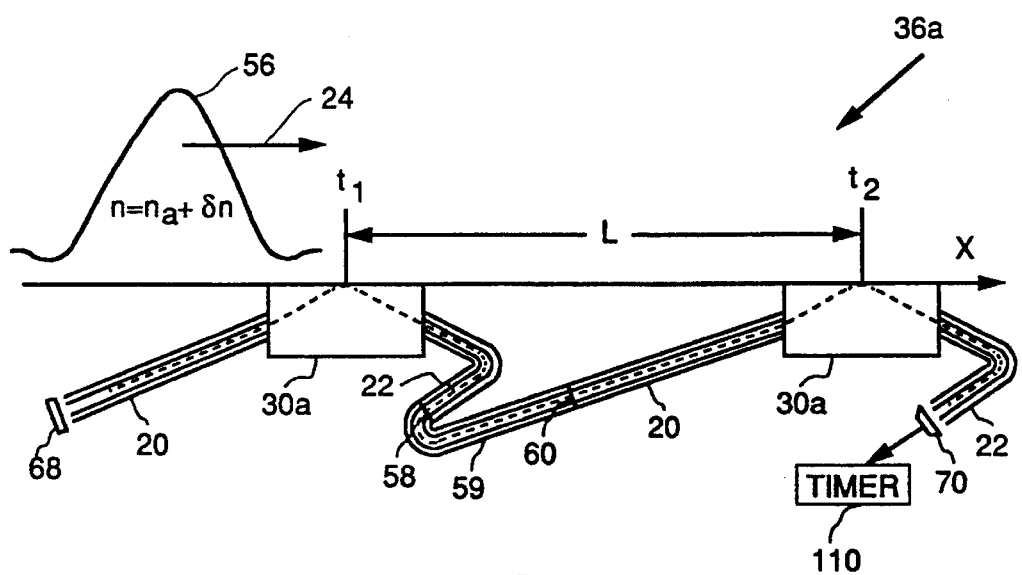
FIG. 4 is a sectional side view of a pulse speed sensor usable in a Mach number sensor.
Figure 5:
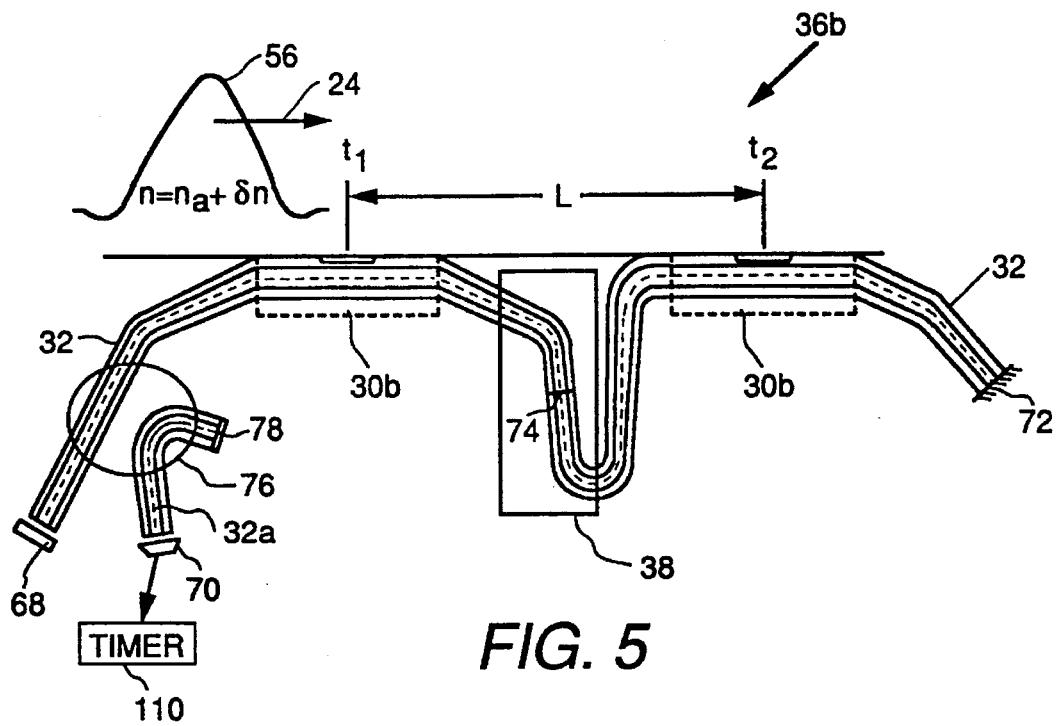
FIG. 5 is a sectional side view of another pulse speed sensor usable in a Mach number sensor.

FIGS. 4–5 are sectional side views of pulse speed sensors 36a and 36b, respectively, usable in a Mach number sensor. The pulse speed sensors each use two TIR detectors to measure elapsed time ($\tau=t_2-t_1$) for passage of the pressure pulse between the TIR detectors. Because the spacial separation L is known, the speed of the pulse is obtained from the equation $v_g=L/\tau$.

The two coupled TIR detectors need not be of the same type. A TIR detector 30a, such as shown in FIG. 2, can be used with a TIR detector 30b, such as shown in FIG. 3. These TIR detectors can either be operated separately or coupled together. Furthermore, the pulse speed sensor of the invention is not limited to use with the TIR detectors shown in FIGS. 2 and 3. Other types of TIR detectors such as rectangular waveguide TIR detectors can be used, for example.

In the embodiment of FIG. 4, a pulse speed sensor 36a includes two TIR detectors 30a of the type described with respect to FIG. 2. The output fiber from one of the TIE detectors can be optically coupled at an end 58 to the input fiber end 60 of the other of the TIR detectors with an optical coupler 59, as shown, or two TIR detectors can share a single fiber between the output of one prism and the input of the other, or the two TIR detectors 30a can each have separate input and output fibers 20 and 22 which are independent of each other. In a pulse speed sensor 36a of the embodiment of FIG. 5, either the same single fiber (or two coupled fibers) can be used for optically coupling the TIR detectors 30b (described with respect to FIG. 3) to each other, or the TIR detectors can have separate fibers for detecting pulses independently of each other, with separate detectors and timers supplying information to a microcomputer (not shown).

Coupling the TIR detectors to each other reduces the number of light sources and light detectors required for a pulse speed sensor. The length L between the two TIR detectors must be large enough that the two consecutive drops in light intensity, which result from pressure pulse 56 passing each of the detectors, can be detected unambiguously. Thus length L must be at least as long as the full width at half the maximum of the distribution (FWHM) of the pressure pulse.

When the TIR detectors are coupled to each other, there are two methods that can be used to detect the change in total internal reflection of light that is guided through the pulse speed sensor. One of these techniques, as shown in FIG. 4, is the direct technique whereby light from a continuous light source 68 that is transmitted through an input fiber 20 is detected by a light detector 70 in optical communication with an output fiber 22. The time difference between the two consecutive losses of intensity detected by light detector 70 and measured by electronic timing means, shown as timer 110, is used to calculate the time elapsed for the pressure pulse to travel through length L.

Figure 4A:
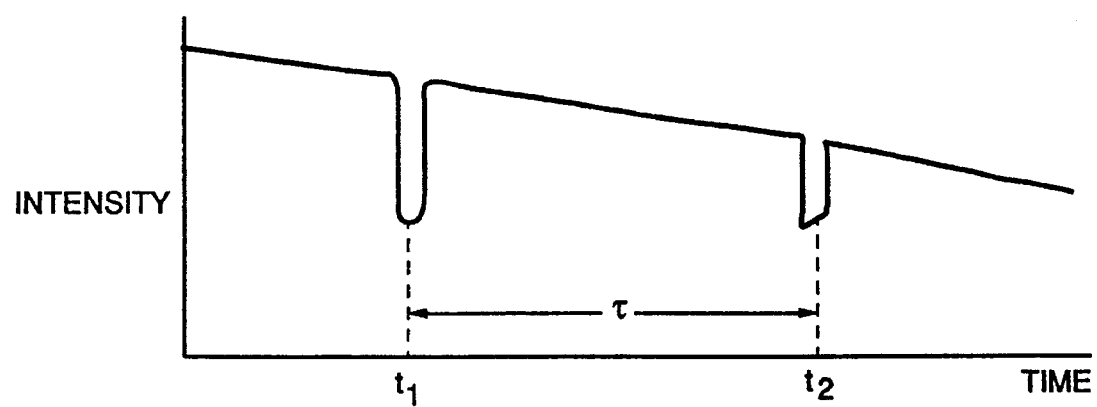
FIG. 4a is an expected graph of light intensity versus time for a pulse speed sensor of the type shown in FIG. 4.

FIG. 4a is an expected graph of light intensity versus time for a pulse speed sensor of the type shown in FIG. 4. A very slight decrease in light intensity occurs over time and momentary steep decreases in intensity occur when a pressure pulse passes by each of the total internal reflection detectors. Because FIG. 4 uses an optical coupler 59 to couple the two TIR detectors, each end of the coupler would reflect some light back to the source and cause a further loss of intensity which, for simplicity, is not shown in FIG. 4a.

In another embodiment, as shown in FIG. 5, techniques based on optical time domain reflectrometry can be used by either coating one end of an optical fiber 32 with a reflective material 72 or cleaving that end. Light source 68 is pulsed in FIG. 5 to enable identification of the response from each of the TIR detectors. Pulsed light source 68 and light detector 70 are directly coupled optically through an optical directional coupler 76 and optical fiber 32a to the other end of fiber 32. The end 78 of fiber 32a is preferably either crushed or coated with an index matching gel, for example, so that no light is reflected from end 78.

In a preferred embodiment, a joint 74 is introduced between the two TIR detectors. Joint 74 can be formed in any one of a number of ways. In one case, two fibers are cleaved and abutted and an adhesive is applied to hold them together. Other options are to form a sudden dent to create a physical distortion in a single fiber or to form a density change in a portion of a single fiber, such as by exposing a portion of a $SiO_2$—$GeO_2$ fiber to ultraviolet light.

Figure 5A:
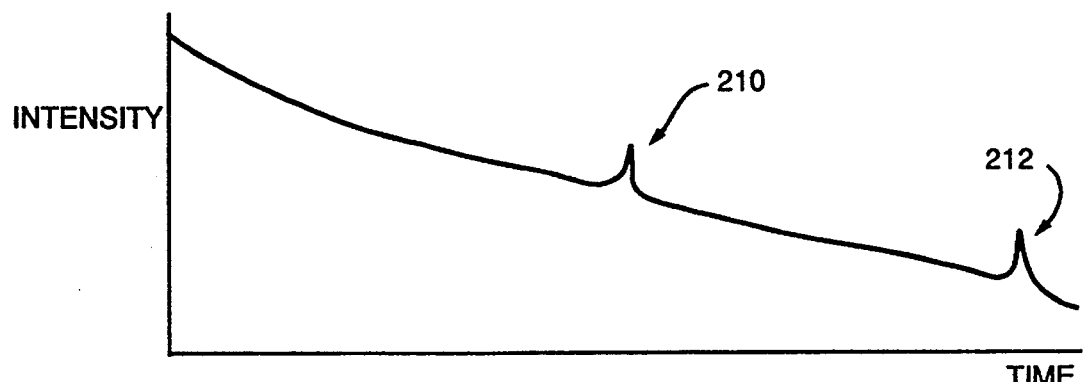
FIGS. 5a–5c are expected graphs of light intensity versus time for a pulse speed sensor of the type shown in FIG. 5.
Figure 5B:
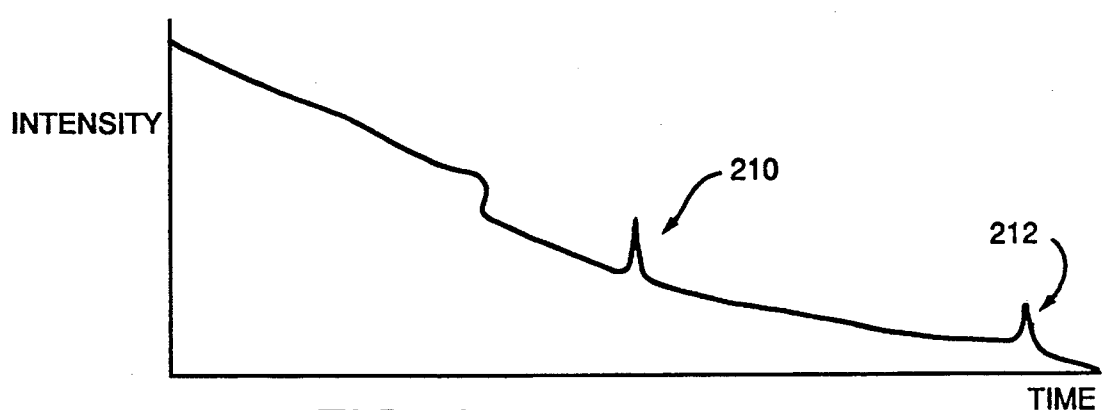
Figure 5C:
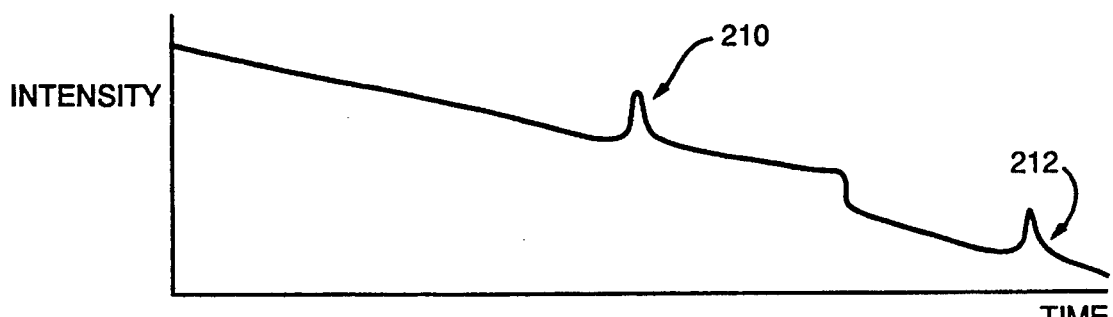

FIGS. 5a–5c are expected graphs of light intensity versus time for a pulse speed sensor of the type shown in FIG. 5. FIG. 5a represents an example graph showing moderate intensity attenuation which could occur when no pressure pulse is present and light reflected from the cleaved surface or reflective material 72 to light detector 70 is not further attenuated by either TIR detector. A first spike 210 of increased intensity is caused by reflection from joint 74 and occurs at the same time during each light pulse period of source 68. A second spike 212 of increased intensity is caused by reflection from cleaved surface or reflective material 72 and occurs at the same time during each light pulse period of source 68.

As shown in FIG. 5b, when a pressure pulse passes the first TIR detector, there is a momentary additional decrease in light intensity caused by a corresponding momentary additional increase in attenuation, due to momentary loss of light through lack of predetermined non-pulse total internal reflection conditions. Similarly, as shown in FIG. 5c, a second momentary additional increase in light attenuation occurs when the pressure pulse passes the second TIR detector. The time difference between these two momentary additional increases in light attenuation corresponds to τ.

Joint 74 is not required, but is useful because first spike 210 is caused by the joint and occurs at the same time relative to the individual detectors for each light intensity measurement. Because the joint is situated between the two TIR detectors, the two additional attenuation increases occur on opposite sides of the joint disturbance, thus enabling easier identification of the responses from the TIR detectors.

An increased length of optical fiber can be obtained between the TIR detectors with an optical fiber lengthener 38 (shown in FIG. 5, but also applicable in the embodiment of FIG. 4) to increase resolution of the pulse speed sensor by further increasing and thus better separating (in time) the responses from the TIR detectors. If is τ excessively short, light responses from the TIR detectors can overlap. If, on the other hand τ is sufficiently large, there is a relatively large time of separation between responses from the two TIR detectors, as well as the joint. The responses from the two TIR detectors are thus better resolved. Because the pressure pulse travels at a speed much less than the speed of light, the time required for light to travel between the TIR detectors is typically orders of magnitude shorter than the time required for the pressure pulse to travel distance L. Hence accuracy and sensitivity of the pulse speed sensor is not affected by sizes of L that can be employed in a turbofan engine.

Figure 6:
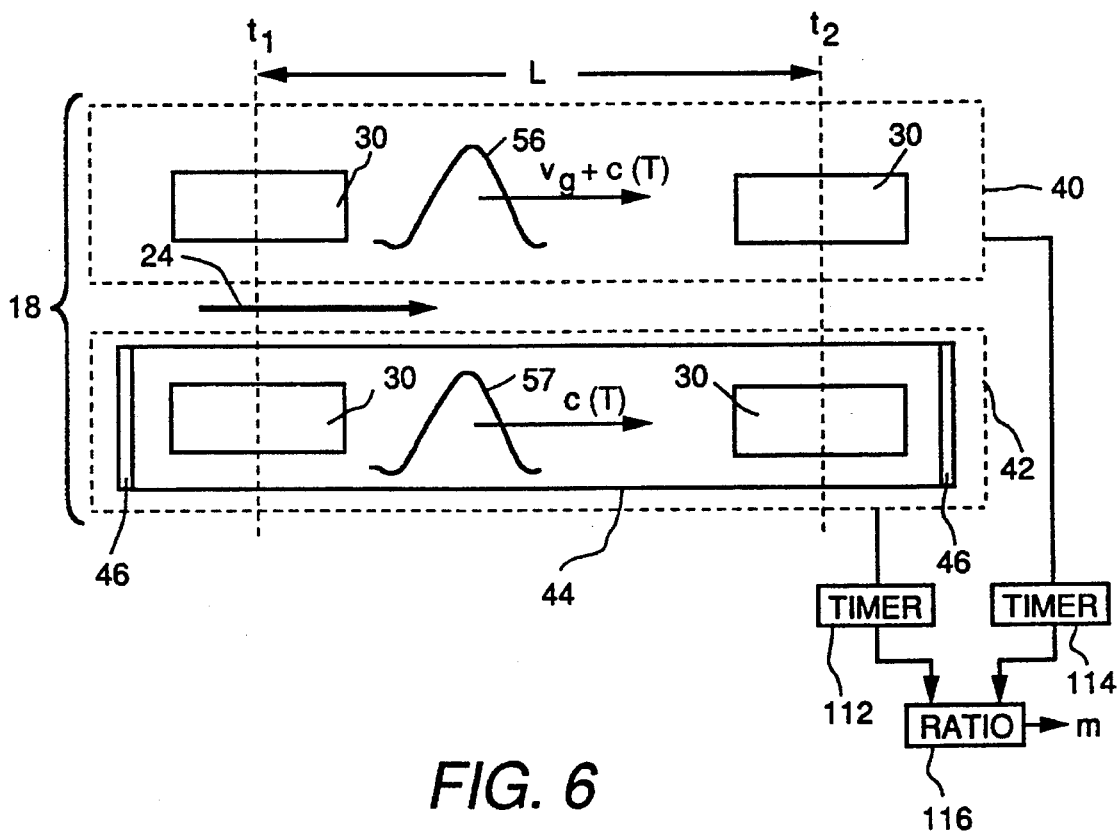
FIG. 6 is a sectional side view of a Mach number sensor of the present invention.

FIG. 6 is a sectional side view of a Mach number sensor 18 of the present invention. The Mach number sensor includes two pulse speed sensors 40 and 42 in parallel and having respective timers 112 and 114. These pulse speed sensors can be of the type s described with reference to FIGS. 4 or 5, a combination of the two types, or a combination in which one or beth of the pulse speed sensors includes one TIR detector 30a of the type described with respect to FIG. 2 and another TIR detector 30b of the type described with respect to FIG. 3. Additional types of pulse speed sensors not incorporating either of the TIR detectors shown in FIGS. 2–3 can be used.

The sound wave generated by the rotating blades of fans 12, shown in FIG. 1, is used to measure the Mach number in the following manner. Generally, pressure pulse 56 travels at the is speed $v_g+c(T)$, wherein $c(T)$ is the speed of sound at the temperature T of the flow and $v_g$ is the velocity of the flow through which the pressure pulse is conducted. A first pulse speed sensor 40 is situated in direct contact with the air flow 24 and is used, in the manner described in conjunction with FIG. 4 or 5, for example, to measure $v_g+c(T)$. A second pulse speed sensor 42 is situated in an enclosure comprising a tube 44 with a soft membrane 46 at both ends. Preferably, the tube, which is situated in contact with air flow 24, comprises a high temperature material with high thermal conductivity such as aluminum, and the membrane comprises silicon or a metallic foil such as aluminum. Tube 44 is filled with air having the same temperature as the air flow due to the high thermal conductivity of the tube material. The membrane keeps the air flow out of the tube but allows a sound wave (which is a second pressure pulse, shown as a sound pulse 57, travelling at the speed of sound in the tube), which occurs when a first pressure pulse from the rotating blades strikes the membrane, to pass through the length of the tube. The front membrane is thus used to couple sound pulse 57 to stationary air in the tube. Since the speed of this air is zero, the sound pulse travels at the speed of sound $c(T)$ inside the tube and is measured by sensing the internal reflection changes induced by the sound pulse. The Mach number M is then calculated, using ratio means 116, from the two measured speeds $(v_g+c(T))$ and $c(T)$ according to:

$$M=(v_g+c(T))/c(T)-1.$$

This Mach number sensor avoids the need for explicit temperature measurements because the stationary air is in thermal equilibrium with the flow. However, the total and static temperatures, $T_T$ and $T_S$ respectively, can be easily obtained by using the Mach number sensor because both $T_S$ and $T_T$ are functions of M and $c(T)$:

$$T_S=c^2(T)/(\gamma g R); \text{ and}$$

$$T_T=T_S(1+M^2(\gamma-1)/2),$$

wherein $\gamma \approx 1.4$ is the specific heat ratio, $g=980$ cm/sec$^2$ is the gravitational constant, and $R=8.317\times 10^7$ ergs per ° C. per mole is the gas constant.

The vibration goals of the Mach number sensors of interest are within 20 g's (gravitational constants) and 100 to 2000 Hz. With this detection mechanism, the Mach number detection is dependent only on the index of refraction change and can easily be designed to be insensitive to these vibration specifications.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A pulse speed sensor, comprising:

two total internal reflection (TIR) detectors, each of said TIR detectors facing an area through which air can pass, said TIR detectors positioned so that air can pass over a first one of said TIR detectors prior to passing over a second one of said TIR detectors; and means responsive to each of said TIR detectors for determining elapsed time for passage of an air pressure pulse between said TIR detectors.

2. The pulse speed sensor of claim 1, wherein said TIR detectors are optically coupled together.

3. The pulse speed sensor of claim 2, further including a light source optically coupled to said first TIR detector and a light detector optically coupled to said second TIR detector.

4. The pulse speed sensor of claim 2, further including a light source and a light detector directionally coupled optically to said first TIR detector, said second TIR detector having a reflective end.

5. The pulse speed sensor of claim 1, further including an optical fiber lengthener optically coupled between said TIR detectors.

6. The pulse speed sensor of claim 1, wherein each of said TIR detectors includes a single optical fiber optically coupling the TIR detectors to each other.

7. The pulse speed sensor of claim 1, wherein each of said TIR detectors comprises:

a prism having a first surface facing said area through which air can pass;

an input optical fiber optically coupled to a second surface of said prism for supplying light to said prism through said second surface; and an output optical fiber optically coupled to a third surface of said prism for detecting light emerging from said prism through said third surface.

8. The pulse speed sensor of claim 1, wherein each of said TIR detectors comprises an optical optical fiber having cladding removed at a surface facing said area through which air can pass.

9. The pulse speed sensor of claim 8, wherein said TIR detectors are optically coupled together.

10. The pulse sensor of claim 1, wherein one of said TIR detectors comprises a prism having a first surface facing said area through which air can pass; an input optical fiber optically coupled to a second surface of said prism for supplying light to said prism through said second surface; and an output optical fiber optically coupled to a third surface of said prism for detecting light emerging from said prism through said third surface; and wherein the other of said TIR detectors comprises a single optical fiber having cladding removed at a surface facing said area through which air can pass.

11. A Math number sensor, comprising:

a first pulse speed sensor situated in direct contact with an open area through which air can pass;

means for generating a first pressure pulse in said open area; and a second pulse speed sensor situated in an enclosure containing stationary air through which a second pressure pulse can pass, said enclosure being situated in said open area and being comprised of thermally conductive material.

12. The Mach number sensor of claim 11, wherein said first pulse speed sensor and said second pulse speed sensor are situated substantially parallel to one another.

13. The Mach number sensor of claim 11, wherein said enclosure comprises a tube having two covered ends.

14. The Mach number sensor of claim 13, wherein said tube comprises aluminum.

15. The Mach number sensor of claim 13, wherein said two covered ends are covered with a soft membrane material which emits said second pressure pulse when struck by said first pressure pulse.

16. The Mach number sensor of claim 15, wherein said soft membrane material is selected from the group consisting of silicon and aluminum.

17. The Mach number sensor of claim 11, wherein each of said first and second pulse speed sensors comprises:

two total internal internal reflection (TIR) detectors, each of said TIR detectors facing an area through which a pressure pulse can pass, said TIR detectors positioned so that said pressure pulse can pass over one of said TIR detectors prior to passing over the other of said TIR detectors; and means responsive to each of said TIR detectors for determining elapsed time for passage of said pressure pulse between said two TIR detectors.

18. The Mach number sensor of claim 17, wherein each of said TIR detectors is selected from the group of TIR detectors consisting of:

a single optical fiber having cladding removed at a surface facing said area through which said pressure pulse can pass; and a prism having a first surface facing said area through which said pressure pulse can pass, an input optical fiber optically coupled to a second surface of said prism for supplying light to said prism through said second surface, and an output optical fiber optically coupled to a third surface of said prism for detecting light emerging from said prism through said third surface.

19. A Mach number sensor, comprising:

means for determining speed of an air pressure pulse;

means for determining speed of sound at a temperature at which the air pressure pulse is propagating; and means for calculating the Mach number sensor in response to data from said pressure pulse speed determining means and said sound speed determining means.

20. The Mach number sensor of claim 19, wherein said means for determining speed of sound comprises a pulse speed sensor situated in an enclosed area having stationary air through which a pressure pulse can pass.

21. The Mach number sensor of claim 20, further including a thermally conductive tube having two covered ends, said tube surrounding said second pulse speed sensor and providing said enclosed area.

22. The Mach number sensor of claim 21, wherein said two covered ends are covered with a soft membrane material.

* * * * *